United States Patent [19]
Omichi et al.

[11] 3,874,877
[45] Apr. 1, 1975

[54] SUBBING METHOD FOR PHOTOGRAPHIC FILM SUPPORT

[75] Inventors: Takenori Omichi; Teppei Ikeda; Shunich Adachihara; Mobuo Yamamoto, all of Kanagawa, Japan

[73] Assignee: Fuji Photo Film Co., Ltd., Kanagawa, Japan

[22] Filed: July 25, 1972

[21] Appl. No.: 275,002

[30] Foreign Application Priority Data
July 30, 1971 Japan.............................. 46-57275

[52] U.S. Cl.................. 96/87 R, 117/34, 117/46 R, 117/47 A, 117/76 F, 117/138.8 F
[51] Int. Cl............................................... G03c 1/80
[58] Field of Search............ 96/87 R; 117/34, 47 A, 117/46 R, 76 F, 138.8 F

[56] References Cited
UNITED STATES PATENTS
2,926,116 2/1960 Keim.................................. 162/164
3,582,339 6/1971 Martens.............................. 96/87 R FOREIGN PATENTS OR APPLICATIONS
920,352 3/1963 Great Britain..................... 96/87 R Primary Examiner—Ronald H. Smith
Attorney, Agent, or Firm—Sughrue, Rothwell, Mion, Zinn and Macpeak

[57] ABSTRACT

A polyethylene terephthalate film for a photographic film support is coated with a polyamide-epichlorohydrin resin layer and then a hydrophilic resin layer as subbing layers prior to the application of a photosensitive emulsion layer. The surface of the polyethylene terephthalate film may be subjected to a surface activation treatment.

14 Claims, No Drawings 3,874,877

SUBBING METHOD FOR PHOTOGRAPHIC FILM SUPPORT

BACKGROUND OF THE INVENTION

1. Field of the Invention

The present invention relates to a method of producing photographic films and, more particularly, it relates to a subbing method for photographic film supports.

2. Description of the Prior Art

Due to their excellent mechanical strength and their good dimensional stability, polyethylene terephthalate films (hereinafter, for brevity designated PET films) have been used widely as supports for printing and photographic films. However, although PET films have excellent properties as phtographic film supports, it is difficult to adhere a photographic emulsion containing hydrophilic gelatin strongly thereto since the surface of the PET film is poor in adhesive properties to coatings applied thereon and has hydrophobic characteristics.

Previously various kinds of research on subbing methods for PET films for overcoming those difficulties were conducted and as a result thereof it was found that the adhesive property between the surface of a PET film and a photographic emulsion layer could be improved by incorporating a polyamide-epichlorohydrin resin prepared from a polyalkylene polyamine and a dibasic carboxylic acid in a subbing layer containing a hydrophilic resin present between the PET film and a photographic emulsion layer (see U.S. Pat. application Ser. No. 169,784, filed on Aug. 6, 1971, now abandoned but refiled as continuation-in-part application Ser. No. 423,619.

SUMMARY OF THE INVENTION

Methods of increasing the adhesive strength of a PET film to a photographic emuslion layer have been investigated further and the present invention in which a photographic emulsion layer with ideal strength can be adhered to a PET film by using the same materials as in the aforesaid prior invention but in a different manner than the above in the structure of the subbing layers has been attained.

That is to say, by forming (1) a layer of the above-described polyamide-epichlorohydrin resin which layer does not contain a hydrophilic resin and (2) a layer of the hydrophilic resin successively on a PET film, the adhesion of a photographic emulsion layer to the PET film can be remarkably improved. Furthermore, an important feature of the subbing method of this invention is that when the subbing layers described above are applied to the surface of a PET film, no adverse influence on the photographic emulsion applied to the surface of the subbing layer thereafter results.

DETAILED DESCRIPTION OF THE INVENTION

The polyamide-epichlorohydrin resin used in this invention can be prepared using the conventional method of forming a polyamide by heating a saturated or unsaturated dibasic carboxylic acid and a polyalkylene polyamine to a reaction temperature and then reacting the polyamide with epichlorohydrin (see, e.g., the specifications of Japanese Patent Publication No. 3547/1960 corresponding to U.S. Pat. No. 2,926,116, U.S. Pat. No. 2,926,116, and U.S. Pat. No. 3,125,552). A suitable molecular weight range of the polyamide-epichlorohydrin resin is from about 500 to 100,000, more preferably from about 1,000 to 20,000.

Examples of suitable dibasic carboxylic acids which can be used in the above reaction include saturated dicarboxylic acids such as succinic acid, glutaric acid, adipic acid, pimelic acid, suberic acid, azelaic acid, sebacic acid, etc., and unsaturated dicarboxylic acids such as itaconic acid, fumaric acid, maleic acid, citraconic acid, mesaconic acid, etc. Also, suitable examples of the polyalkylene polyamines which can be used in the above reaction include polyethylene polyamines such as diethylene triamine, triethylene tetramine, tetraethylene pentamine, etc., and polypropylene polyamines such as dipropylene triamine, etc.

Now, typical examples of the method of producing the polyamide-epichlorohydrin resin used in the present invention will be shown below.

Synthesis 1 (Production of aqueous solution (1) of a polyamide-epichlorohydrin resin):

500 of diethylene triamine was dissolved in 200 ml of water and, while bubbling nitrogen gas into the solution, 632 g of adipic acid was further dissolved in the solution. The mixture was heated to 130°–170°C. for 2.5 hours while distilling away 410 ml of water during the heating. After removing the heating bath, the reaction mixture was cooled gradually and when the temperature of the reaction mixture reached 90°–110°C., water was added thereto to dissolve the reaction product and to make the total volume to 7480 ml. Then, while stirring the aqueous solution of the polyamide obtained above at 50°–55°C., 441 g of epichlorohydrin was added to the solution over a period of 1 hour. Thereafter, the mixture was stirred for 1 hour at 70°C. The reaction product thus obtained was cooled to room temperature and the pH thereof was adjusted to 5.5 by adding 6 N hydrochloric acid. Furthermore, the reaction product was diluted with water so that the total volume became 8481 ml. Thus, an aqueous solution of a polyamide-epichlorohydrin resin containing 15% by weight solid components (aqueous solution (1) of a polyamide-epichlorohydrin resin) was obtained.

Synthesis 2 (Production of aqueous solution (2) of a polyamide-epichlorohydrin resin):

By conducting the same procedures as described in Synthesis 1 under the same conditions and using the same operations as those of Synthesis 1 except that 915 g of tetraethylene pentamine was used in place of the diethylene triamine and 1455 g of epichlorohydrin was used in place of 441 g of epichlorohydrin, an aqueous solution of a polyamide-epichlorohydrin containing 15% by weight solid components (aqueous solution (2) of a polyamide-epichlorohydrin resin was obtained.

Synthesis 3 (Production of aqueous solution (3) of a polyamide-epichlorohydrin resin):

500 ml of a methanol solution containing 73 g of adipic acid was cooled below 20°C. and then 250 ml of a methanol solution containing 51.5 g of diethylene triamine was added to the above solution under stirring. After removing the solvent by distillation, the reaction product mixture was concentrated and dried to provide a solid having a faintly yellow color. The solid thus obtained was heated for 5 hours to 180°C. in an autoclave. The reaction product was withdrawn from the autoclave, dissolved in 300 ml of water, and 4.5 liters of acetone was added to the solution, whereby a yellow-brown resinous material was precipitated. By recovering the resinous material followed by drying, 90 g of a hygroscopic polyamide was obtained as a yellow-brwon solid. The polyamide was dissolved in water to provide 750 of an aqueous solution thereof. Thereafter, the aqueous solution was processed as described in Synthesis 1 except that 50 g of epichlorohydrin was used and the amount of water for diluting the final product was reduced, whereby an aqueous solution of a polyamide-epichlorohydrin containing 10% by weight solid components (aqueous solution (3) of a polyamide-epichlorohydrin resin) was obtained.

In order to form the layer of the polyamide-epichlorohydrin resin prepared as described above on a PET film according to the method of this invention, the polyamide-epichlorohydrin resin is first dissolved in a solvent capable of dissolving the resin. As the solvent for dissolving the polyamide-epichlorohydrin resin, water, a solvent miscible with water, or a mixture of two or more such solvents may be used. However, even a solvent immiscible with water, such as methylene chloride, may also be used as the solvent for the polyamide-epichlorohydrin resin by using it together with a solvent miscible with water, such as methanol.

It is necessary that the concentration of the solids in the solution of the polyamide-epichlorohydrin to be applied to a PET film be at least 0.0001 parts by weight per 100 parts by volume of the coating liquid. If the solids content is less than 0.0001 parts by weight, it is difficult to obtain a support having the desired adhesive strength when the solution is applied to the surface of the PET film. Also, if the solids content in the solution of the polyamide-epichlorohydrin is higher than 12 parts by weight per 100 parts by volume of the coating liquid, it is difficult to form a uniform layer of the resin on the PET film, although the adhesive property may be highly improved, and thus in such a case the coated surface becomes greatly uneven. Accordingly, it is preferable to use a solution of the resin having a solids content of from 0.005 to 10 parts by weight per 100 parts by volume of the coating liquid to obtain a layer of the polyamide-epichlorohydrin resin having a high adhesive strength and a good coated surface.

If desired, additionally, a surface active agent such as saponin, an antistatic agent such as alkyl benzoimidazole sulfonic acid derivatives (see Japanese Patent Publication No. 14,906/1965), polycarboxylic acid alkali metal salts (see U.S. Pat. No. 2,074,647), aromatic amides (see U.S. Pat. No. 2,461,473), diphenyl sulfones such as 4,4'-dimethyl-diphenylsulfone (see U.S. Pat. No. 2,461,474), an etching agent such as phenol, orthochlorophenol, cresol, other phenol derivatives, etc (see Japanese Patent Publication Nos. 2603/1968 and 2604/1968), etc., can be incorporated in the solution of the polyamide-epichlorohydrin described above to improve the coating properties, antistatic properties, adhesive properties, etc., of the subbing solution.

The solution of the polyamide-epichlorohydrin solution prepared as described above can be applied to a PET film using any conventional technique such as dipping methods, roller coating methods, air knife coating methods, spray coating methods, and the like followed by drying to form the layer of the polyamide-epichlorohydrin resin on the PET film. A suitable coating amount of the polyamide-epichlorohydrin can range from $1 \times 10^{-4}$ g/m$^2$ to 3.6 g/m$^2$, more preferably, from $2.5 \times 10^{-4}$ g/m$^2$ to 1.0 g/m$^2$ of the PET film.

The layer of hydrophilic resin which can be used in the present invention can be a high molecular compound soluble in an organic solvent or water soluble or water swellable, that is, compounds such as cellulose acetate phthalate, cellulose acetate maleate, vinyl copolymers containing maleic acid anhydride such as vinyl acetate/maleic acid anhydride (1:1) copolymer and the like. The organic solvent contains at least one side chain having a —OH group, a —COOH group, a

group, a —SO$_3$M group (wherein M is H or an alkali metal), a —NH$_2$ group, a cyclic amide group, a

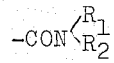

group (wherein R$_1$ and R$_2$ each is H or an alkyl group having from 1 to 4 carbon atoms), or a heterocyclic ring containing nitrogen atom (see German Patent No. 1,040,898); a mixed acetal containing a —COOM group (wherein M is H or an alkali metal) of polyvinylalcohol; a partial ester of a dihydric acid; a mixture of polyvinylpyrrolidone and polyacrylic acid and the like. Then, the layer of a hydrophilic resin such as gelatin or a maleic anhydride vinyl acetate copolymer can be formed on the layer of the polyamide-epichlorohydrin resin formed as described above by applying to the layer a solution or a dispersion of the hydrophilic resin containg a solvent or a swelling agent for the PET film and drying the coating. A suitable coating amount of the hydrophilic resin is from about 2 to 300 cc/cm$^2$.

As described above a solvent or a swelling agent for the PET film is used. Suitable such solvents or swelling agents are materials such as a ketone or aldehyde having an aromatic group or partially saturated aromatic group or an aldehyde having a heterocyclic ring containing a nitrogen atom (see British Patent No. 772,600); a carboxylic acid (R—COOH or R—COOH, wherein R is an aromatic group or an aromatic heterocyclic ring containing a nitrogen atom, X is —CH$_2$— or —OCH$_2$—), or an anhydride an ester or an amide thereof (see British Patent No. 776,157); alcohols, ketones, carboxylic acids, substituted carboxylic acids or the esters thereof (see British Patent No. 797,425); benzyl alcohol having an aromatic group which is substituted by nitro group or chlorine atom (see U.S. Pat. No. 2,830,030); chloral hydrate (German Patent No. 1,020,457); pyrrole (German Patent No. 1,092,652) and the like. More specifically materials such as benzoic acid, salicylic acid, salicylic acid ester, monochloroacetic acid, dichloroacetic acid, trichloroacetic acid, trifluoroacetic acid, 2-nitropropanol, benzyl alcohol, benzaldehyde, acetonyl acetone, acetophenone, benzamide, benzonitrile, benzylamine, nicotinic acid methyl ester and the like.

Other solvents or swelling agents for PET are phenol and its derivatives such as phenol, ortho-chlorophenol, cresol and the like. The above described organic solvent or swelling agent for the PET is present at a level of from 1 to 25 wt.% in the coating solution of the polyamide-epichlorohydrin resin or hydrophilic resin. With more than 25 wt.%, the surface flatness of the produced film is degraded, and with less than 1 wt.%, the adhesive properties of the produced film is poor. The amounts of within the above range may be varied depending on activation of the surface of the PET, the type of the organic solvent or swelling agent used for the PET film, containing other organic solvents, etc. Naturally, the organic solvent or swelling agent for PET film may be a mixture or two or more organic solvents or swelling agents, and in this case, the total amount of organic solvents or swelling agents is from 1 to 25 wt.%. The contents of the solvent or the swelling agent for the PET film may be changed appropriately depending upon the kind of the solvent or the swelling agent and the kind of other organic solvents present together with it. Also, the solvent or the swelling agent for the polyethylene terephthalate can be a mixture of such solvents or such swelling agents. The solution or despersion of the hydrophilic resin can further contain a hardening agent such as chromium acetate, epoxy derivatives, ethyleneimine derivatives (see Japanese Patent Publication Nos. 2603/1968 and 2604/1968), an antistatic agent such as alkyl benzoimidazole sulfonic acid derivatives (see Japanese Patent Publication No. 14,906/1965), polycarboxylic acid alkali metal salts (see U.S. Pat. No. 2,074,647), aromatic amides (see U.S. Pat. No. 2,461,473), diphenyl sulfones such as 4,4'-dimethyldiphenylsulfone (see U.S. Pat. No. 2,461,474), a dye such as anthraquinone dyes (see Japanese Patent Publication Nos. 23,028/1970, 8,734/1972 and 8,735/1972), a hydrophilic polymer such as gelatin or hydrophobic polymer such as nitrocellulose, partially saponified vinylchloride/vinyl acetate copolymers, etc., in addition to the hydrophilic resin, the solvent, the dispersing agent, for improving the strength of the subbing layer, the adhesive properties between the layer of the hydrophylic resin and the support or the photographic emulsion layer, and the antistatic properties thereof as well as for coloring the support for photographic films.

According to the process of this invention the subbing layers can be formed on the PET film without applying any specific treatment to the surface of the film but when a surface activation treatment is applied to the surface of the PET film prior to the application of the a subbing layers, support having a stronger adhesive properties to a photographic emulsion layer than when no such activation treatment is employed can be obtained. The term "surface active" means the properties of a surface wherein the surface has good receptivity to printing inks or good wetability to water wherein an organic solvent impregnates well in the surface. Well-known surface activation treatments include an ultraviolet irradiation treatment, a corona discharging treatment, a saponification treatment with an acid or an alkali, an oxidation treatment by ozone, and electron beam irradiation treatment, a high frequency wave treatment, an ultrasonic wave treatment, and an activated gas treatment.

The invention will further be explained in greater detail by reference to the following typical examples, which are not intended to limit the invention in any way. Unless otherwise indicated all parts and percentages are by weight.

In addition, the adhesive property of a photosensitive emulsion layer to the film support was determined using the following conventional test and evaluated in the following manner.

Adhesion test at dry conditions:

The photographic emulsion layer applied to the support film was, after drying, scratched in checkerboard pattern (the interval between the lines of the pattern was about 4 mm) using a blade, an adhesive tape was attached to the surface of the emulsion layer, and the tape was separated quickly. Accordingly, where more than 90% of the emulsion layer remained on the support without being stripped off, this case was ranked as Class A; where 60–90% of the emulsion layer remained, this case was ranked as Class B; and where less than 60% of the emulsion layer remained, this case was ranked as Class C. Adhesion test at wet condition on processing:

In each step of development, fixing, and water washing, one scratch was formed in the photographic emulsion layer on the support in the processing solution using a stylus, and the scratched portion was rubbed with a fingertip in a direction perpendicular to the scratched line. In this case, where the emulsion layer was not stripped off greater than the scratch, this case was ranked as Class A; where the maximum width of the scratched portion was less than 5 mm, this case was ranked as Class B; and all other cases poorer than above was ranked as Class C.

EXAMPLE 1

A PET film having a thickness of 100 microns was coated with a solution of a polyamide-epichlorohydrin having the following composition;

| | |
|---|---|
| Aqueous solution (1) Containing 15% Polyamide-epichlorohydrin Resin | 0.1 cc |
| Methanol | 100 cc | and after drying the layer at 100°C., the layer thus dried was coated with a gelatin dispersion consisting of 1 g of gelatin, 2 g of water, 2 g of acetic acid, 50 g of methanol, 20 g of methylene chloride, 20 g of acetone, and 5 g of o-chlorophenol followed by drying. A gelatino silver halide emulsion was applied to the layer and dried. The adhesive properties of the photographic emulsion layer to the support were quite superior in both the dry case and the wet case to a control sample prepared by applying a gelatin dispersion having the same composition as above to the surface of a PET film not having the layer of the polyamide-epichlorohydrin resin, drying the layer, and applying a gelatino silver halide emulsion. The results of the adhesion tests are shown below.

| | Adhesion (dry) | Adhesion (wet) |
|---|---|---|
| (1) Photographic Film having Layer of Polyamide-epichlorohydrin Resin | A-B | A |
| (2) Control Sample | C | C |

Also, the photographic properties of the photographic film prepared by applying the layer of the polyamide-epichlorohydrin resin as the subbing layer according to the present invention were excellent and almost same as those of the control sample.

EXAMPLE 2

A PET film having a thickness of 75 microns was coated with a solution of a polyamide-epichlorohydrin resin having the following composition;

| | |
|---|---|
| Aqueous solution (2) Containing 15% Polyamide-epichlorohydrin Resin | 0.3 cc |
| Methanol | 40 cc |
| Acetone | 60 cc | and after drying, a solution of a hydrophilic resin consisting of 1.3 g of a maleic anhydride-vinyl acetate (1 : 1) copolymer, 45 g of methanol, 25 g of acetone, 15 g of methylene chloride, 10 g of monochloroacetic acid, 0.4 of chromium acetate, and 5 g of phenol was applied to the layer followed by drying. Then, a gelatino silver halide emulsion was applied to the subbing layer and dried. The adhesive properties of the emulsion layer to the support were quite superior, in both the dry case and the wet case, to those of a control sample prepared by applying a solution of the hydrophilic resin having the same composition as above to a PET film having no layer of the polyamide-epichlorohydrin, drying the layer, and applying a gelatino silver halide emulsion to the subbing layer. The results of the adhesion tests are shown below.

| | Adhesion (dry) | Adhesion (wet) |
|---|---|---|
| (1) Photographic Film Having Layer of Polyamide-epichlorohydrin | A-B | A |
| (2) Control Sample | C | C |

Also, the photographic properties of the photographic film prepared by applying the layer of the polyamide-epichlorohydrin resin as the subbing layer according to the present invention were excellent and with the same as those of the control sample.

EXAMPLE 3

A PET film having a thickness of 100 microns was subjected to a corona discharging treatment by passing the film through a space between a corona discharging roll and a rod electrode of a LEPEL-type surface treating machine. The PET film was passed through the space at a speed of 3 meters/min., using a frequency of 10 kc per second, with the interval between the rod electrode and the film being 0.8 mm, and using an electric power of 50 watts.

The film thus treated was coated with a solution of a polyamide-epichlorohydrin resin having the following composition;

| | |
|---|---|
| Aqueous solution (3) Containing 10% Polyamide-epichlorohydrin Resin | 0.3 cc |
| Distilled Water | 100 cc | and after drying the layer, a dispersion of gelatin consisting of 1 g of gelatin, 2 g of water, 5 g of tetrachloroethane, 3 g of salicylic acid, 22 g of methanol, and 60 g of methylene chloride was applied to the layer and dried. Then, a gelatino silver halide emulsion was applied to the surface of the gelatin layer and dried. The adhesive properties of the emulsion layer to the support were quite excellent, in both the dry case and the wet case, in comparison with those of a control sample prepared by applying the dispersion of gelatin having a composition the same as described above to the PET film subjected to the same corona discharging treatment as described above but having no layer of the polyamide-epichlorohydrin resin, drying the layer, and applying a gelatino silver halide emulsion to the subbing layer. The results of the adhesion tests are shown below:

| | Adhesion (dry) | Adhesion (wet) |
|---|---|---|
| (1) Photographic Film Having Layer of Polyamide-epichlorohydrin Resin | A | A |
| (2) Control Sample | C | B |

Also, the photographic properties of the photographic film having the layer of the polyamide-epichlorohydrin resin as the subbing layer according to the present invention were excellent and almost the same as those of the control sample.

EXAMPLE 4

The PET film having a thickness of 100 microns was irradiated with ultraviolet rays by passing the film under a cylindrical quartz mercury lamp of 1 killowatt with a spacing between the mercury lamp and the film surface at a speed of 5 meters/min. The film base thus treated was then coated with a solution of a polyamide-epichorohydrin resin having the following composition;

| | |
|---|---|
| Aqueous Solution (1) Containing 15% Polyamide-epichlorohydrin Resin | 0.3 cc |
| Methanol | 50 cc |
| Acetone | 50 cc | and after drying the layer, a dispersion of gelatin consisting of 1 g of gelatin, 2 g of water, 3 g of salicylic acid, 20 g of methanol, 50 g of methylene chloride, 20 g of acetone, and 4 g of o-chlorophenol was applied to the layer and dried at 120°C. Then, a gelatino silver halide emulsion was applied to the layer and dried.

The adhesive properties of the emulsion layer to the support were quite excellent, in both the dry case and the wet case, in comparison with those of a control sample prepared by applying the dispersion of gelatin having the same composition as described above to the PET film irradiated with ultraviolet rays as described above but having no layer of the polyamide-epichlorohydrin resin, drying the layer, and applying a gelatino silver halide emulsion. The results of the adhesion tests are shown below:

| | Adhesion (dry) | Adhesion (wet) |
|---|---|---|
| (1) Photographic Film Having Layer of Polyamide-epichlorohydrin Resin | A | A |
| (2) Control Sample | B-C | B |

Also, the photographic properties of the photographic film having the layer of the polyamide-epichlorohydrin resin as the subbing layer according to the present invention were excellent and almost the same as those of the control sample.

EXAMPLE 5

A PET film having a thickness of 100 microns was subjected to a flame treatment using a propane-oxygen burner disposed at an interval of 0.8 mm from the surface of the film (10 liters/hour of propane and 5 liters/- hour of oxygen) and then coated with a solution of a polyamide-epichlorohydrin having the following composition;

| Aqueous solution (2) Containing 15% | |
|---|---|
| Polyamide-epichlorohydrin Resin | 1.0 cc |
| Methanol | 60 cc |
| Methylene Chloride | 40 cc | and after drying the layer, a gelatin dispersion consisting of 1 g of gelatin, 1 g of water, 4 g of acetic acid, 5 g of phenol, 50 g of methanol, and 50 g of acetone was applied to the layer and dried at 120°C. Then, a gelatino silver halide emulsion was applied to the layer and dried.

The adhesive properties of the emulsion layer to the support of the photographic film thus obtained were quite excellent, in both the dry case and the wet case, in comparison with those of a sample prepared by applying the gelatin dispersion having the same composition as described above to a PET film treated with a flame as described above but having no layer of the polyamide-epichlorohydrin resin, drying the layer, and applying a gelatino silver halide emulsion. The results of the adhesion tests are shown below:

| | Adhesion (dry) | Adhesion (wet) |
|---|---|---|
| (1) Photographic Film Having Layer of Polyamide-epichlorohydrin Resin | A | A |
| (2) Control Sample | C | B |

Also, the photographic properties of the photographic film having the layer of the polyamide-epichlorohydrin resin as the subbing layer according to the present invention were excellent and almost the same as those of the control sample.

While the invention has been described in detail and by reference to specific embodiments thereof it will be apparent to one skilled in the art that various changes and modifications can be made therein without departing from the spirit and scope thereof.

What is claimed is:

1. A subbing method for a photographic film which comprises applying to the surface of a polyethylene terephthalate film a first layer of a polyamide-epichlorohydrin resin comprising the reaction product of a polyalkylene polyamine and a dibasic carboxylic acid, said first layer not containing a hydrophilic resin and then applying a second layer of a hydrophilic resin onto said polyamide-epichlorohydrin resin layer.

2. The subbing method for a photographic film as set forth in claim 1, wherein said polyalkylene polyamine is a polyethylene polyamine or a polypropylene polyamine.

3. The subbing method for a photographic film as set forth in claim 1, wherein said dibasic carboxylic acid is succinic acid, glutaric acid, adipic acid, pimelic acid, suberic acid, azelaic acid or sebacic acid.

4. The subbing method for a photographic film as set forth in claim 1, wherein said dibasic carboxylic acid is itaconic acid, fumaric acid, maleic acid, citraconic acid, or mesaconic acid.

5. The subbing method for a photographic film support as set forth in claim 1, wherein said layer of said polyamide-epichlorohydrin resin is formed by applying a solution of said polyamide-epichlorohydrin resin having a solids content of 0.0001 parts by weight to 12 parts by weight per 100 parts by volume of a coating liquid.

6. The subbing method for a photographic film support as set forth in cliam 1, wherein said hydrophilic resin is gelatin.

7. The subbing method for a photographic film support as set forth in claim 1, wherein said hydrophilic resin is a maleic anhydride-vinyl acetate copolymer.

8. The subbing method for a photographic film support as set forth in claim 1, wherein said surface of said polyethylene terephthalate film has been surface activated.

9. The subbing method for a photographic film support as set forth in claim 8, wherein said surface has been surface activated with a corona discharing treatment.

10. The subbing method for a photographic film suppor as set forth in claim 8, wherein said surface has been surface activated with ultraviolet irradiation.

11. The subbing method for a photographic film support as set forth in claim 8, wherein said surface has been surface activated with a flame treatment.

12. A method for preparing a photographic element comprising the subbing method for a photographic film support as set forth in claim 1 and applying a photosensitive emulsion layer to said hydrophilic resin layer.

13. A polyethylene terephthalate film coated with a substratum layer which comprises a polyamide-epichlorohydrin resin comprising the reaction product of a polyalkylene polyamine and a dibasic carboxylic acid, which substratum does not contain a hydrophilic resin but is receptive to a hydrophilic resin coating.

14. The film of claim 13 further comprising a hydrophilic resin coated onto said polyamide-epichlorohydrin resin layer.

* * * * *